(12) United States Patent
Zenz (10) Patent No.: US 8,312,045 B2
(45) Date of Patent: Nov. 13, 2012

(54) CONFIGURATION DATA CONTENT FOR A CLUSTERED SYSTEM HAVING MULTIPLE INSTANCES

(75) Inventor: Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 1807 days.

(21) Appl. No.: 10/750,003

(22) Filed: Dec. 30, 2003

(65) Prior Publication Data

US 2005/0149545 A1 Jul. 7, 2005

(51) Int. Cl.
*G06F 7/00* (2006.01)
*G06F 17/30* (2006.01)

(52) U.S. Cl. ............... 707/790; 707/791; 707/793

(58) Field of Classification Search ............ 707/101
See application file for complete search history.

(56) References Cited

U.S. PATENT DOCUMENTS

| | | | |
|---|---|---|---|
| 4,939,724 A | 7/1990 | Ebersole | |
| 5,553,239 A | 9/1996 | Heath et al. | |
| 6,003,075 A * | 12/1999 | Arendt et al. | 709/221 |
| 6,014,669 A * | 1/2000 | Slaughter et al. | 707/10 |
| 6,300,948 B1 * | 10/2001 | Geller et al. | 715/866 |
| 6,366,915 B1 * | 4/2002 | Rubert et al. | 707/10 |
| 6,377,950 B1 * | 4/2002 | Peters et al. | 707/10 |
| 6,564,261 B1 * | 5/2003 | Gudjonsson et al. | 709/227 |
| 6,658,018 B1 * | 12/2003 | Tran et al. | 370/465 |
| 6,886,035 B2 * | 4/2005 | Wolff | 709/219 |
| 6,892,231 B2 | 5/2005 | Jager et al. | |
| 6,934,768 B1 * | 8/2005 | Block et al. | 709/248 |
| 6,944,829 B2 * | 9/2005 | Dando | 715/798 |
| 6,954,757 B2 | 10/2005 | Zargham et al. | |
| 6,973,473 B1 * | 12/2005 | Novaes et al. | 709/201 |
| 6,983,324 B1 * | 1/2006 | Block et al. | 709/228 |
| 7,047,497 B2 * | 5/2006 | Patrizio et al. | 715/760 |
| 7,058,601 B1 * | 6/2006 | Paiz | 705/37 |
| 7,072,934 B2 | 7/2006 | Helgeson et al. | |
| 7,093,247 B2 | 8/2006 | Ashworth et al. | |
| 7,155,466 B2 * | 12/2006 | Rodriguez et al. | 707/205 |
| 7,165,189 B1 * | 1/2007 | Lakkapragada et al. | 714/31 |
| 7,181,731 B2 | 2/2007 | Pace et al. | |
| 7,185,071 B2 | 2/2007 | Berg et al. | |
| 7,228,369 B2 * | 6/2007 | Nakamura | 710/38 |
| 7,251,662 B2 * | 7/2007 | Behman et al. | 707/101 |
| 2002/0069272 A1 | 6/2002 | Kim et al. | |
| 2002/0078132 A1 | 6/2002 | Cullen et al. | |
| 2002/0120717 A1 * | 8/2002 | Giotta | 709/219 |
| 2002/0161750 A1 | 10/2002 | Rajarajan et al. | |
| 2002/0161870 A1 | 10/2002 | French et al. | |

(Continued)

OTHER PUBLICATIONS

Office Action mailed Oct. 15, 2008 for U.S. Appl. No. 10/749,851, filed Dec. 30, 2003, whole document.

(Continued)

*Primary Examiner* — Jay Morrison
(74) *Attorney, Agent, or Firm* — Schwegman Lundberg Woessner P.A.

(57) ABSTRACT

A property sheet system and method for managing and organizing configuration information for components contained within a clustered environment. The property sheet system includes a user interface to display contents of a property sheet data structure. The property sheet data structure includes a plurality of entries, each entry associated with a non-modifiable parameter and optionally a modifiable parameter. The user interface enables a user to modify a selected modifiable parameter associated with the property sheet data structure. Once the selected modifiable parameter has been modified, the modified parameter is stored independently with respect to the non-modifiable parameters in the property sheet data structure.

8 Claims, 5 Drawing Sheets

U.S. PATENT DOCUMENTS

| | | |
|---|---|---|
| 2003/0126136 A1* | 7/2003 | Omoigui .................... 707/10 |
| 2003/0167331 A1 | 9/2003 | Kumar et al. |
| 2003/0187991 A1* | 10/2003 | Lin et al. .................... 709/227 |
| 2004/0010502 A1 | 1/2004 | Bomfim et al. |
| 2004/0019639 A1 | 1/2004 | E, Sandhya et al. |
| 2004/0019662 A1 | 1/2004 | Viswanath et al. |
| 2004/0073782 A1* | 4/2004 | Price et al. .................... 713/1 |
| 2004/0148183 A1 | 7/2004 | Sadiq |
| 2004/0148369 A1 | 7/2004 | Strassner |
| 2004/0153639 A1 | 8/2004 | Cherian et al. |
| 2004/0249904 A1* | 12/2004 | Moore et al. .................... 709/216 |
| 2004/0249918 A1 | 12/2004 | Sunshine |
| 2004/0254584 A1* | 12/2004 | Sarin et al. .................... 606/102 |
| 2004/0260748 A1* | 12/2004 | Springer et al. ............. 709/200 |
| 2004/0260773 A1* | 12/2004 | Springer, Sr. ................. 709/206 |
| 2005/0015471 A1* | 1/2005 | Zhang et al. ................. 709/221 |
| 2005/0114315 A1* | 5/2005 | Tanner et al. .................... 707/3 |
| 2005/0251500 A1 | 11/2005 | Vahalia et al. |
| 2006/0001262 A1 | 1/2006 | Bormioli |
| 2006/0010438 A1 | 1/2006 | Brady, Jr. et al. |
| 2006/0106590 A1 | 5/2006 | Tseng et al. |

OTHER PUBLICATIONS

Non-Final Office Action mailed Oct. 27, 2008, U.S. Appl. No. 10/749,957, filed Dec. 30, 2003, whole document.

Nuno, Preguica, et al., "Data Management Support for Asynchronous Groupware", ACM, 2000, pp. 69-78.

Office Action mailed Oct. 3, 2007 for U.S. Appl, No. 10/750,002, filed Dec. 30, 2003, whole document.

Final Office Action mailed Apr. 14, 2008 for U.S. Appl. No. 10/750,002, filed Dec. 30, 2003, whole document.

* cited by examiner

CONFIGURATION DATA CONTENT FOR A CLUSTERED SYSTEM HAVING MULTIPLE INSTANCES

BACKGROUND

1. Field

Embodiments of the invention generally relate to configuration data, and in particular to a property sheet system for a clustered system having multiple instances.

2. Background

A clustered system may include a collection of server nodes and other components that are arranged to cooperatively perform computer-implemented tasks, such as providing client computers with access to a set of services and resources. A clustered system may be used in an enterprise software environment to handle a number of tasks in parallel. Typically, a load balancing algorithm is implemented within a clustered system to distribute incoming requests in some manner among multiple server nodes. One aspect of a clustered system is its scalability as it has the flexibility to enable additional cluster elements to be incorporated with the existing cluster elements. Additionally, a clustered system also provides the flexibility to enable existing cluster elements, or components within a cluster element, to be upgraded or modified.

Typically, components, such as files, applications, objects or hardware devices, contained within a clustered system have a number of configuration properties associated with them. As a clustered system grows, the number and types of components contained in the clustered system that require configuration also increases and the complexity associated with the management of the configuration parameters of these component increases correspondingly. Typically, configuration parameters associated with a particular component or a set of components may be grouped and organized in a separate property sheet. The property sheet may be a file or a data structure having a number of entries to define a set of properties associated with one or more components contained within a clustered system. Accordingly, by selecting an appropriate property sheet associated with a particular component or a set of components, a user can use the selected property sheet to display and edit configuration parameters associated with the component(s). The data contained in a property sheet may be accessed, during startup, by the clustered system to control the operating characteristics of a corresponding component based on the configuration parameters set forth in the property sheet.

SUMMARY

In accordance with one embodiment of the invention, a property sheet system and method is disclosed for managing and organizing configuration information for components contained within a clustered environment. The property sheet system includes a user interface to display contents of a property sheet data structure. The property sheet data structure includes a plurality of entries, each entry associated with a non-modifiable parameter and optionally a modifiable parameter. The user interface enables a user to modify a selected modifiable parameter associated with the property sheet data structure. Once the selected modifiable parameter has been modified, the modified parameter is stored independently with respect to the non-modifiable parameters in the property sheet data structure.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, specific details are set forth. However, it is understood that embodiments of the invention may be practiced without these specific details. In other instances, well-known software or hardware components, structures, techniques and methods have not been shown in detail to avoid obscuring the understanding of this description.

Figure 1:
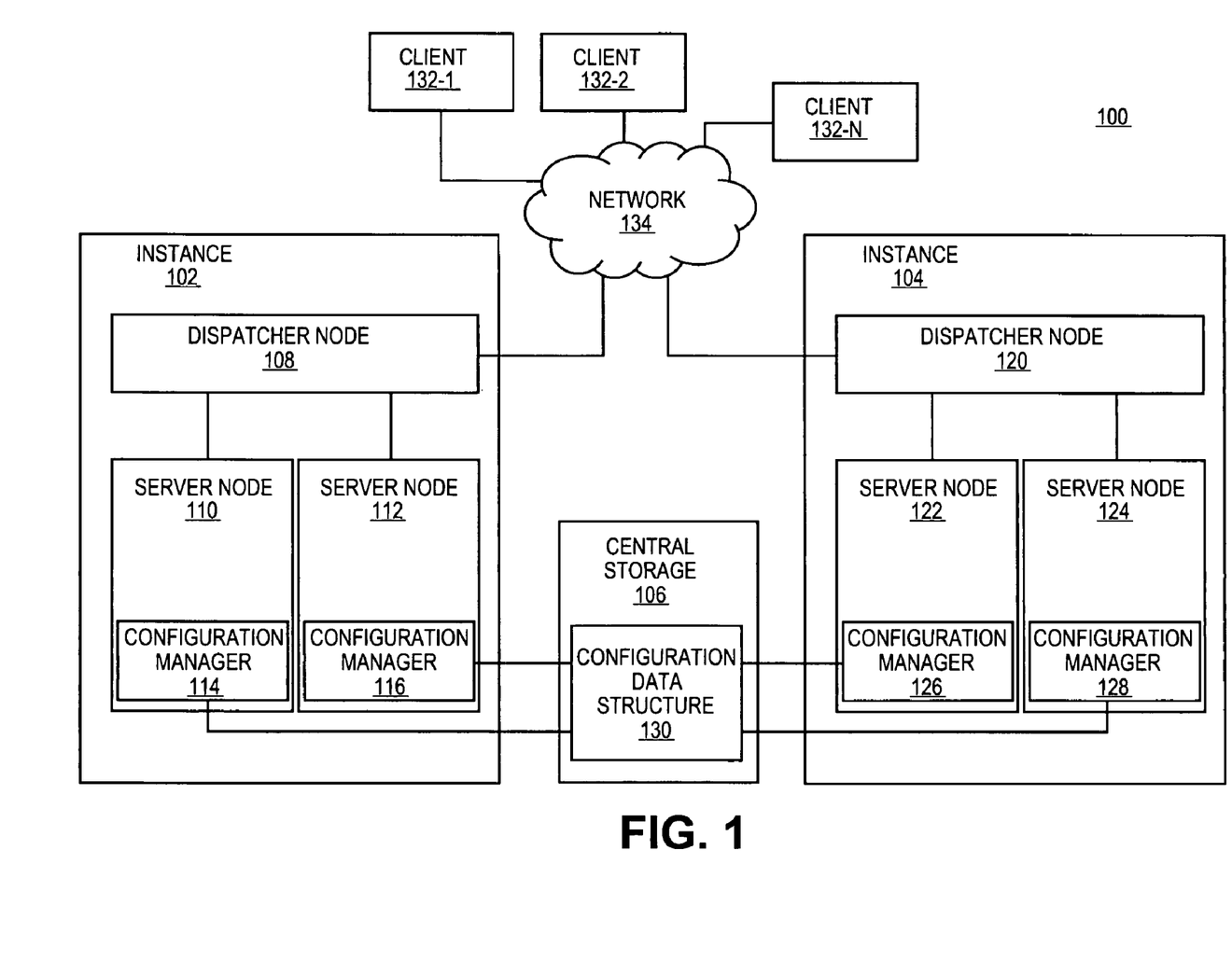
FIG. 1 shows a simplified representation of a clustered system having a number of instances according to one embodiment of the invention.

FIG. 1 shows a simplified representation of a clustered system 100 coupled to client computers 132-1 through 132-N via a network according to one embodiment of the invention. The clustered system 100 includes a set of instances 102, 104 and a central storage 106 coupled to the instances. The first instance 102 includes a number of server nodes 110, 112 and a dispatcher node 108, which dispatches requests across the multiple server nodes 110, 112. Similarly, the second instance 104 includes server nodes 122, 124 and a dispatcher node 120. Although, in the illustrated embodiment, a clustered system having two instances with each instance containing two server nodes is shown, it should be noted that any number of instances may be incorporated within the clustered system and any number of server nodes may be implemented by any particular instance.

In one embodiment, the dispatcher nodes 108, 120 distribute requests from client computers 132-1 through 132-N based on the load on the respective server nodes. Client computers 132-1 through 132-N may communicate with the server nodes 110, 112, 122, 124 contained with the instances 102, 104 via a network 134, which may include, but is not limited to, a local area network, a wide area network, the Internet, or any combination thereof. The network 134 may employ any type of wired or wireless communication channels capable of establishing communication between computing devices.

Also included in the clustered system 100 is a central storage 106, which is in communication with the instances 102, 104. In one embodiment, the central storage 106 is used to centrally store configuration information associated with various components contained within the clustered system 100. In one embodiment, the configuration information is organized in a configuration data structure 130, which the operating system programs and application programs of the cluster elements (e.g., individual server nodes) may use during initialization and runtime to control their operational characteristics. Accordingly, during startup, each of the configuration managers 114, 116, 126, 128 included within the server nodes 110, 112, 122, 124, respectively, retrieves relevant portions of the configuration data structure 130 and stores the retrieved portions of the configuration data structure locally within each respective server node.

In one embodiment, a Java platform, such as a Java 2 Platform Enterprise Edition (J2EE), is implemented by the instances. J2EE is a Java platform that can be used to develop, deploy and maintain enterprise applications. The clustered system 100 may be used to provide a scalable web server environment that permits substantially real-time access to information for a widely distributed user base. Additionally, the clustered system 100 provides efficient deployment of applications and services across the server nodes contained within the clustered system.

Figure 2:
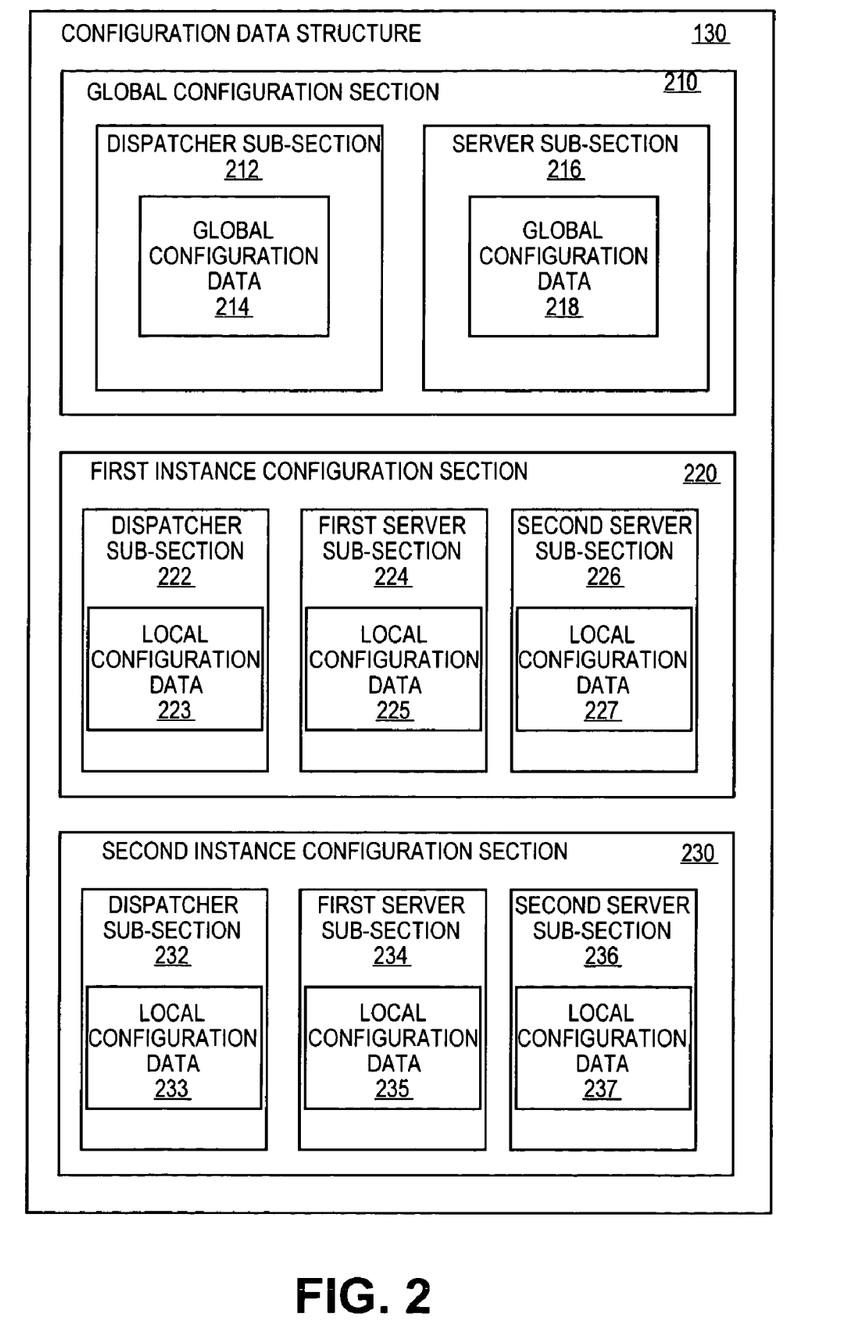
FIG. 2 shows a block diagram of a configuration data structure according to one embodiment.

FIG. 2 shows an organization of a configuration data structure 130 according to one embodiment. The configuration data structure 130 is divided into a global configuration section 210, a first instance configuration section 220 and a second instance configuration section 230. The global configuration section 210 is used to contain global configuration information that is valid on all cluster elements (e.g., server nodes) or components contained within the cluster element. The global configuration section 210 is divided into a number of sub-sections; namely a dispatcher sub-section 212 to contain global configuration information relating the dispatcher nodes contained within the clustered system and a server sub-section 216 to contain global configuration information relating to all other server nodes (i.e., non-dispatcher server nodes) contained within the clustered system. In one embodiment, the configuration data structure is configured such that the global configuration data 214, 218 contained within the global configuration section 210 is modifiable, for example, by an end user. Specifically, when a user wants to change a setting which is global to the entire cluster (such as the location of the central database, or the central message/lock server, etc.), the user may change a global setting by accessing the global configuration section 210 of the configuration data structure 130.

Also included in the configuration data structure 130 is a first instance configuration section 220, which contains local configuration information relating to the first instance 102 of the clustered system 100. Similarly, the second instance configuration section 230 contains local configuration information relating to the second instance 104 of the clustered system 100. Each individual instance configuration section 220, 230 is further divided into sub-sections associated with each individual server node and dispatcher node contained within the respective instance. For example, the first server sub-section 224 of the first instance configuration section 220 contains local configuration data 225 relating to the first server node 110 of the first instance 102. Organizing the configuration data in a hierarchical manner facilitates easy understanding of the configuration data layout. Additionally, such hierarchical organization facilitates easy retrieval of relevant configuration information by a configuration manager of a respective server node.

It should be noted that after an initial deployment of the configuration data structure 130, some of the configuration data contained within the global configuration section 210 may no longer be valid for some of the server nodes contained within the clustered system. In such cases, instead of directly modifying the data contained within the global configuration section, the modification of global configuration data is stored within corresponding sub-sections of the local configuration sections 220, 230. Accordingly, when a user changes data contained within the global configuration section, local configuration settings may be created in the local configuration sections 220, 230 that define the changed configuration data.

Figure 3:
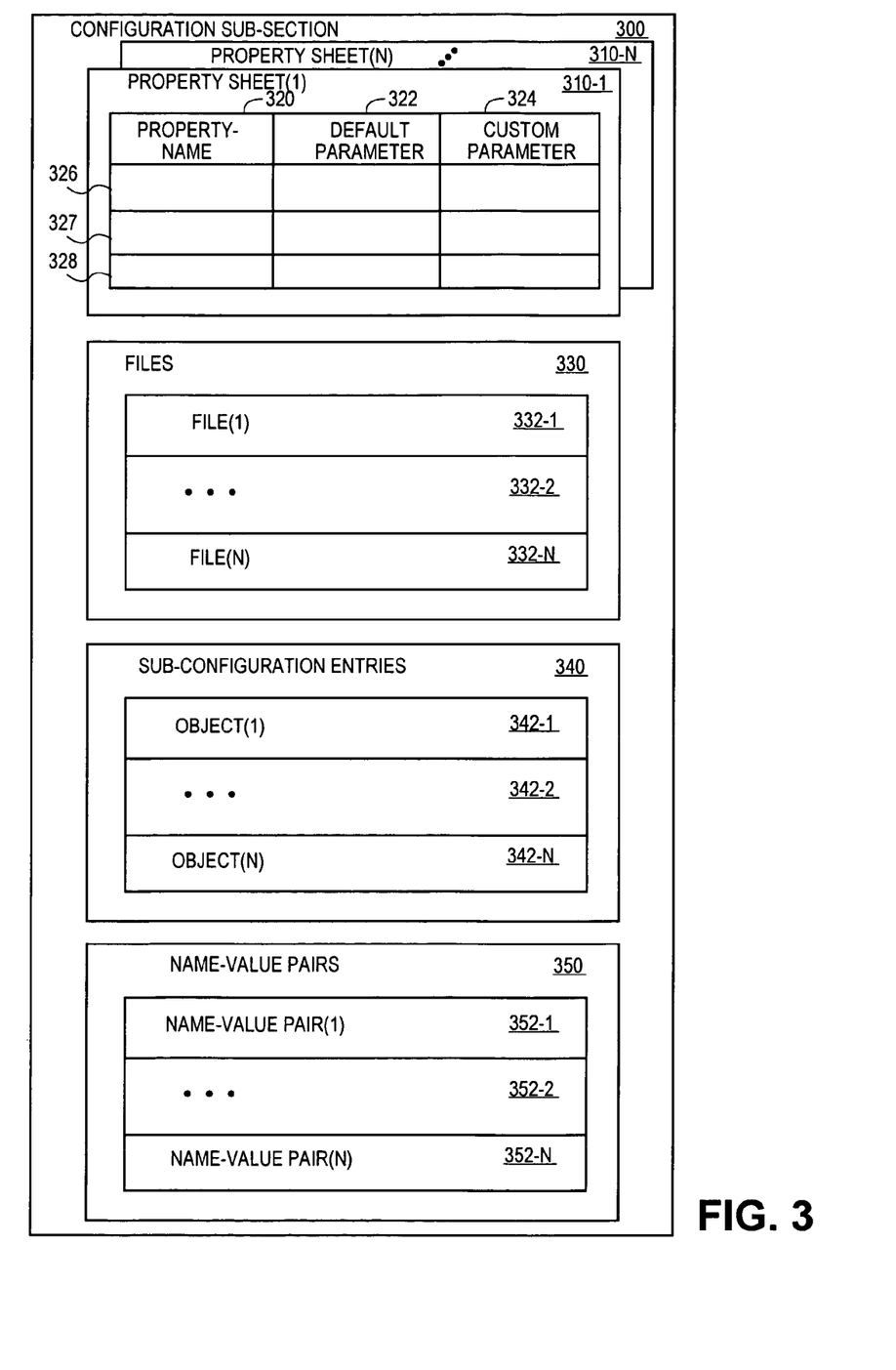
FIG. 3 shows a block diagram of a configuration subsection of the configuration data structure according to one embodiment of the invention.

FIG. 3 shows a block diagram of a configuration sub-section 300 of a configuration data structure according to one embodiment. In one embodiment, the configuration sub-section 300 is used to contain local configuration information associated with a particular cluster element, such as a server node. In the illustrated embodiment, the configuration data structure 300 includes a number of property sheet 310-1 through 310-N, files 332-1 through 332-N, and sub-configuration entries 342-1 through 342-N (referred to in FIG. 3 as "objects").

Each property sheet 310 (also referred to as "property sheet data structure") includes a set of properties 326-328 associated with a particular component. Each property 326-328 included in the property sheet data structure 310 is associated with a property name 320, a default parameter 322 (also referred to as "non-modifiable parameter") and optionally a customizable parameter 324 (also referred to as "modifiable parameter"). It should be noted that because the default parameters are stored independently of the custom parameters, the default parameters will not be overwritten during the modification of the custom parameters. In the context of the present disclosure, the term "component" is used to describe any files, applications, objects or hardware devices. And, the term "parameter" is used in the context of the present disclosure to describe any attributes, settings or the like to define a particular property associated with a component. The default and custom parameters 322, 324 contained in the property sheet 310 may be expressed in terms of, for example, a number, string, boolean or bytearray.

In accordance with one embodiment, only the custom configuration parameters 324 may be modified by an end user, and the default configuration parameters 322 contained within a property sheet are not user-modifiable. Since users are only permitted to modify the custom parameters 324, this ensures that default parameters are not lost with modification of the parameters contained within a property sheet. When a particular component is initially deployed in a clustered system, the default configuration parameters from a respective property sheet is used to define a set of properties associated with that particular component. After the initial deployment, if one of the configuration parameters contained in the property sheet is modified or customized, this is accomplished by entering a custom parameter in a corresponding entry row of the property sheet. Because the default parameters are not affected by this process, the default parameter setting may be retrieved when needed.

In general, a set of properties associated among different components will vary. By way of example, properties associated with a component may include memory size (e.g., cache size), server name, port address, type of operating system, Java path, etc.

Also included in the configuration sub-section 300 of a configuration data structure is a set of binary files 330, sub-configuration entries 340 and a set of name-value pairs 350. In one embodiment, each name value pair 352-1 through 352-N maps a key name to a relatively small amount of data (e.g., object). In contrast, each file 332-1 through 332-N is used to map a key name to a potentially large set of data. By organizing configuration data into property sheets 310, files 330 sub-configuration entries 340 and name value pairs 350, such organization facilitates easy understanding of configuration data layout. While one embodiment of a configuration data structure is shown and described with reference to FIG. 3, it should be noted that other suitable configuration data structure may be used to organize property sheets and other configuration data.

One aspect of the clustered system is its scalability in terms of adding components to the existing components. As the clustered system grows, the number and types of components contained in the clustered system also increases and the complexity associated with the management of the configuration of these components increases correspondingly. Accordingly, one embodiment of the invention provides a property sheet system to facilitate management of configuration parameters associated with various components contained within a clustered system.

Figure 4A:
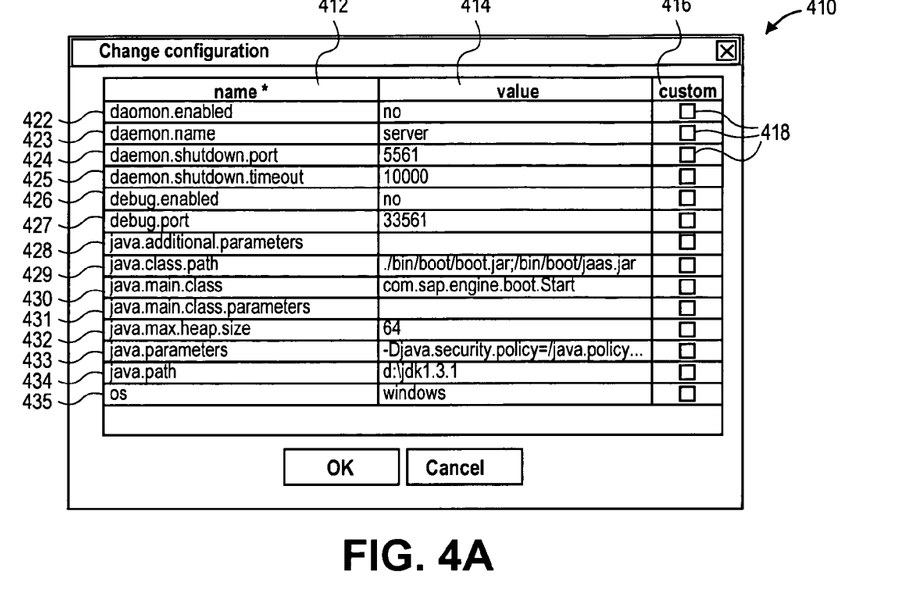
FIG. 4A shows a screenshot of a property sheet dialog box according to one embodiment of the invention.

Illustrated in FIG. 4A is a screenshot of a property sheet dialog box 410 according to one embodiment of the invention. The property sheet dialog box 410 may be used to display the contents of a property sheet associated with a particular component or a group of components. Within a clustered system, there can be a number of components that use a property sheet to manage the configuration parameters associated therewith. Accordingly, the configuration data structure 130 will contain reference to a number of property sheets, which can be accessed during startup and runtime of the clustered system to control the operations characteristics of components based on configuration parameters set forth in the respective property sheets.

Figure 4B:
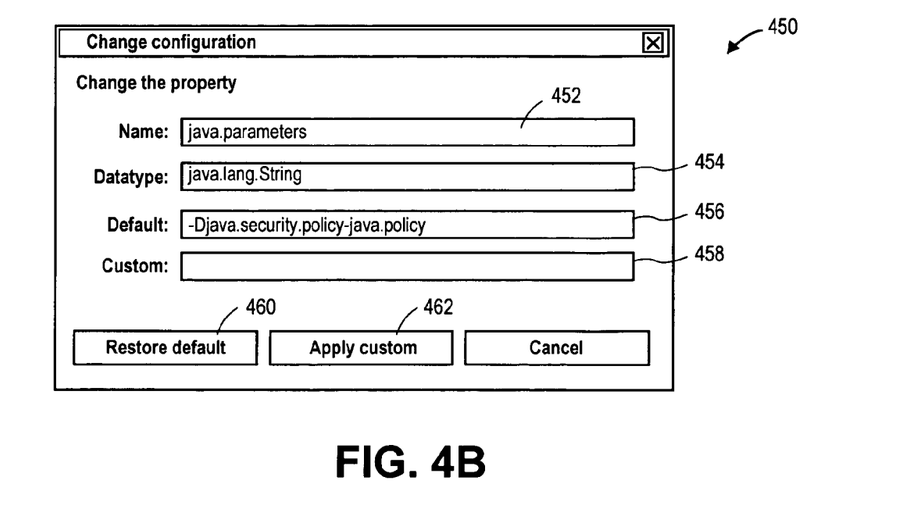
FIG. 4B shows a screenshot of a dialog box for modifying parameters contained in a property sheet according to one embodiment of the invention.

In the illustrated embodiment, the property sheet dialog box 410 includes a number of entry rows 422 through 435 and three columns 412, 414, 416. The first column 412 is used to display names of corresponding properties. The second column 414 is used to display configuration parameters associated with corresponding properties. The third column 416 is used to indicate if the configuration parameter displayed in the second column 414 is a default parameter or a custom parameter. The third field 416 may be used as a button for selecting a second dialog box 450 (shown in FIG. 4B) for modifying configuration parameters contained in the property sheet. Specifically, by clicking on a custom check box 418 contained in the third column 416, this will lead to a "Change Property Sheet Entry" (CPSE) dialog box 450, as shown in FIG. 4B.

The CPSE dialog box 450 may be used by an end user to modify a corresponding configuration parameter contained in a property sheet. The CPSE dialog box 450 includes a first field 452 to display the property name, a second field 454 to display the data type associated with the property, a third field 456 to display the default parameter associated with the property and a fourth field 458 for entering the new custom configuration parameter. The CPSE dialog box 450 further includes a "Restore Default" button 460 and a "Apply Custom" button 462. The "Apply Custom" button 462 may be selected to set or apply the new custom parameter. Alternatively, the default configuration parameter specified in the default field 456 may be restored by selecting the "Restore Default" button 460.

As indicated above, the default parameters associated with the properties listed in a property sheet are not user-modifiable. In one embodiment, this is accomplished by providing a user interface (e.g., the property dialog box 410 and the CPSE dialog box 450) that does not allow a user to modify the default values using the user interface, for example, as shown in FIGS. 4A and 4B. In other words, because the property dialog box 410 and the CPSE dialog box 450 only permit the users to modify the custom configuration parameters, the default parameters associated with a property sheet will remain unchanged during the change configuration process. Additionally, because the default parameters are stored independently of the custom parameters, the default parameters will not be overwritten during the modification of the custom parameters.

Figure 5:
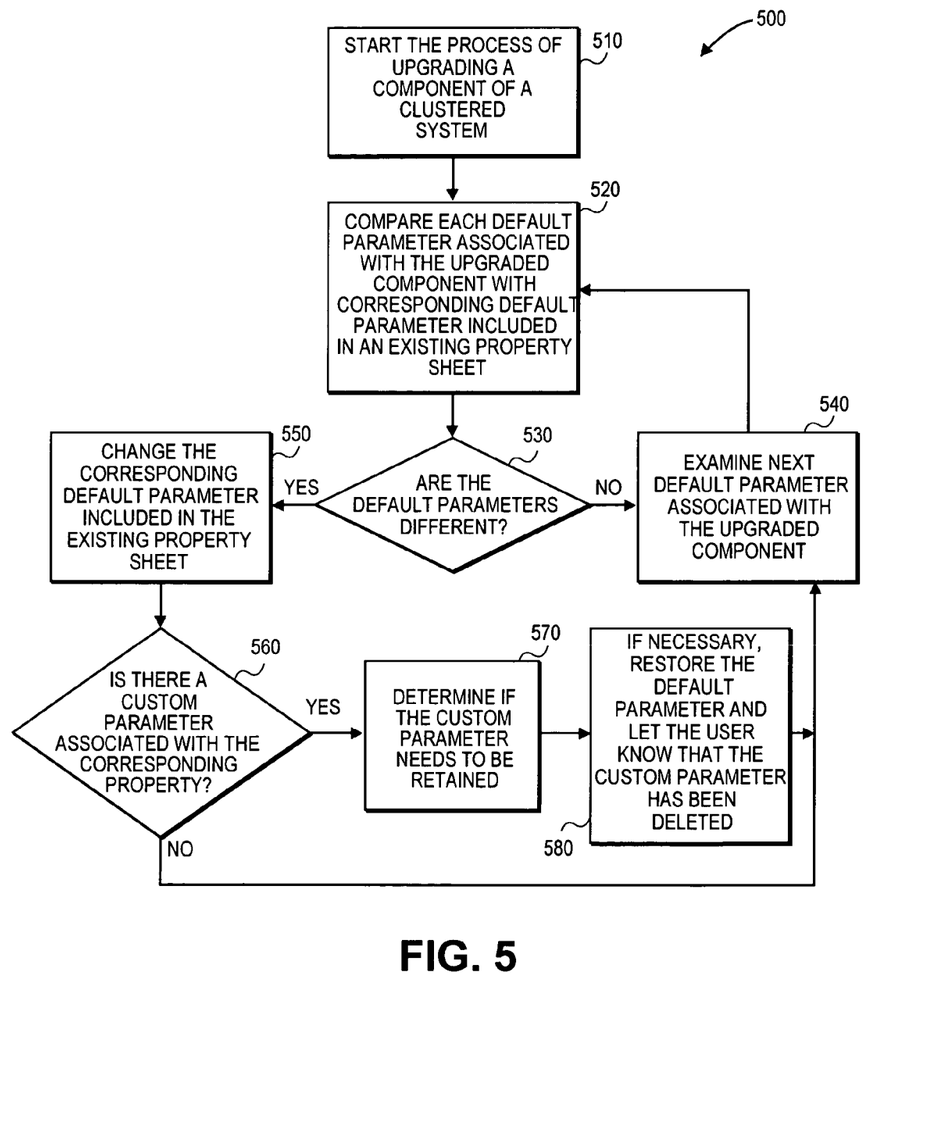
FIG. 5 shows a flowchart diagram illustrating a process for updating default and custom parameters associated with a property sheet during an upgrade of a component according to one embodiment of the invention.

Referring to FIG. 5, the general operations of an upgrade tool is shown for updating default and custom parameters associated with a property sheet during an upgrade of a cluster component according to one embodiment. In one embodiment, the upgrade tool is implemented using a software program running in a computer system. In another embodiment, at least a portion of the upgrade tool is performed manually without a software program. In block 510, the process of upgrading a component of a clustered system is started. Typically, the upgraded component will be associated with an existing property sheet contained within the configuration data for the clustered system. The existing property sheet corresponding to the upgraded component will include a number of properties, each property being associated with a default parameter and an optional custom parameter. It should be noted that the default parameters associated with the new upgraded component may be different from the old component being replaced. Accordingly, in one embodiment, the upgrade tool modifies the default parameters in the existing property sheet to conform to the upgraded component. In one embodiment, the upgrade tool identifies and returns a list of all property names, which may have an upgrade conflict. The properties having possible conflicts are those, for which the default parameter was changed by the upgrade tool, but a custom parameter exists. In one embodiment, the upgrade tool is configured to make a decision as to how to deal with these problematic properties. The upgrade tool may require user interaction for resolving these conflicts. In one embodiment, the upgrade tool determines if a custom parameter associated with each of the identified property is valid with the upgraded component and makes a decision as to what actions to take based on the validity of the custom parameter.

The upgrade tool proceeds in a loop (blocks 520-580) to perform a configuration parameter update process for each of the properties listed in a property sheet. The loop works its way through a list of properties to determine which parameter setting contained within the property sheet need to be modified. In block 520, the upgrade tool compares a default parameter of the upgraded component, with a corresponding default parameter included in the existing property sheet. Then, in block 530, the upgrade tool determines if the compared default parameters are different. If the compared default parameters are the same (block 530, no), the upgrade tool proceeds with the examination of the next default parameter associated with the upgraded component in block 540. If the end of the property list has not been reached, the upgrade tool resumes to block 520.

If the compared default parameters are different (block 530, yes), the upgrade tool automatically changes the corresponding default parameter included in the existing property sheet in block 550. Then, in block 560, the upgrade tool determines if there is a custom parameter associated with the corresponding property. If there is no custom parameter associated with the property (block 560, no), the upgrade tool proceeds to block 540 to examine the next parameter in the property sheet. Otherwise, if there is a user-specified custom parameter associated with the property (block 560, yes), the upgrade tool makes a determination whether the user-specified custom parameter is still valid with the upgraded component and needs to be retained in block 570. Then, in block 580, if the upgrade tool believes that the existing custom parameter is no longer valid and needs to be deleted, the upgrade tool may restore the default parameter associated with the upgrade component by deleting or deselecting the custom parameter and let the user know the custom parameter has been deleted or deselected.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   means for displaying contents of a property sheet containing configuration information associated with a component contained within a clustered system, the property sheet having a plurality of properties, wherein each of said properties is associated with a property name, a non-modifiable default parameter and a custom parameter; and
   means for receiving input to select and modify a parameter associated with a property included in the property sheet; and
   means for selectively updating the parameters included in the property sheet in response to replacing a component by comparing each default parameter of the component to be replaced with a corresponding default parameter of a replacement component.

2. The system of claim 1, further comprising:
   means for receiving input to select between the default parameter and the custom parameter to be applied to a property included in the property sheet.

3. The system of claim 2, wherein the means for displaying further comprises:
   means for indicating if a configuration parameter displayed by the means for displaying is a default parameter or a custom parameter.

4. The system of claim 1, further comprising:
   means for automatically updating a default parameter included in the property sheet with a different default parameter associated with a corresponding property of the replaced component.

5. The system of claim 1, further comprising:
   means for determining if a custom parameter included in the property sheet is valid with the replaced component.

6. The system of claim 1, further comprising:
   means for deselecting a custom parameter in response to the custom parameter being not valid with the replaced component.

7. A machine-readable medium that provides instructions, which when executed by a processor cause the processor to perform operations comprising:
   displaying contents of a property sheet data structure representing configuration information associated with at least one component within a clustered system, the property sheet data structure including a plurality of property names, a plurality of non-modifiable default parameters and a plurality of custom parameters;
   receiving input to select a custom parameter included in the property sheet data structure;
   storing the modified custom parameter without changing a default parameter corresponding to the modified custom parameter; and
   selectively updating the parameters included in the property sheet data structure in response to replacing of a component by comparing each default parameter of the component to be replaced with a corresponding default parameter of a replacement component.

8. The machine-readable medium of claim 7, wherein the operations performed by the processor further comprise:
   automatically updating a default parameter included in the property sheet data structure with a different default parameter associated with a corresponding property of the replaced component;
   determining a custom parameter included in the property sheet data structure is valid with the replaced component; and
   deselecting an applied custom parameter in response to the applied custom parameter being not valid with the replaced component.

* * * * *